Figures 1, 2, 3, 4:
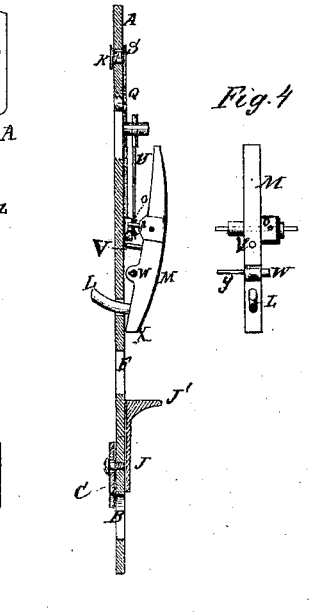

T. NOEL.
Improvement in Watchmakers' Gauges.

No. 115,090. Patented May 23, 1871.

Witnesses:
A. W. Almqvist
Wm. H. C. Smith

Inventor:
T. Noel.
Per Munn & Co.
Attorneys.

115,090

UNITED STATES PATENT OFFICE.

THEODORE NOEL, OF MEMPHIS, TENNESSEE.

IMPROVEMENT IN WATCH-MAKERS' GAGES.

Specification forming part of Letters Patent No. 115,090, dated May 23, 1871.

*To all whom it may concern:*

Be it known that I, THEODORE NOEL, of Memphis, in the county of Shelby and State of Tennessee, have invented a new and Improved Watch-Maker's Tool; and I do hereby declare that the following is a full, clear, and exact description thereof, which will enable others skilled in the art to make and use the same, reference being had to the accompanying drawing forming part of this specification.

This invention relates to a new and improved gaging-tool for watch-makers' use in gaging glasses, mainsprings, arbors, wheels, and various other parts of watches.

Figure 1 is a face view of my improved tool. Fig. 2 is a view of the reverse side. Fig. 3 is a longitudinal section on the line $x\,x$ of Fig. 2, and Fig. 4 is a plan of the lever employed to gage the depth of the glasses and work a pointer for gaging various other articles.

Similar letters of reference indicate corresponding parts.

A is a small plate of brass or other metal, of any convenient size and shape, with a round hole, B, near one end and a slide, C, near said hole, with a semicircular notch, D, in the end working over said hole, which slide is fitted in dovetail ways and made adjustable toward or from the hole, and to be held in any position by the clamp-screw E. Above this plate C is a slot, F, and above the latter a scale, G, of lines numbered to forty, more or less, for gaging the diameter of the glass, which is placed with one edge against the end of plate C. H is a circular slot above the scale G, with a scale, I, arranged along it. K is the pointer of a vibrating arm on the other side of the plate, which is made to move on scale I by the action of the bottom of the concave part of the glass on the pin L, projecting through a hole in plate A at the same time that the diameter is gaged, so that both operations may be performed at once, the pointer K indicating by the scale I the depth or degree of flatness of the glass at the same time the diameter is read on the scale G. The pin L projects through the plate A from a lever, M, pivoted at about the center in studs N on the reverse side of the plate, seen in Fig. 2, from the axle of which lever a pin, O, projects downward toward the plate into a notch, P, in the hub of a finger, Q, which is pivoted to the plate at R under the axle of the lever, and extends to the slot H for the point S to sweep over the scale T thereat, and to carry the pointer K, sweeping the scale I at the other side. This finger is forced back to the zero mark by a spring, U, and it maintains the lever M in the position indicated in Fig. 3. V is a pin projecting from the under side of lever M near the axle toward the plate A, for gaging the thickness of a watch-spring or other thin article by placing it on the plate against the studs N and under the pin which holds the lever up, and the finger on the scale T in a position to show the thickness. W is a pin arranged through the lever M parallel with its axis of motion; also with the side of plate A, and about half the distance from the axle to the end X, which pin is flattened or otherwise shaped eccentrically to its axis in the part $y$ for adjusting it relatively to its distance from plate A by turning it on its axis. The said eccentric pin is for gaging the width of the mainsprings by placing them edgewise between the pin and the plate, when the pointer S will indicate the width on the scale T. Z is an arm projecting to the right of finger Q near one of the studs N, whereon is an adjustable angle-plate, $a$, between which and the said arm the width or thickness of any small articles—such as pivots, pinions, or other small articles—may be gaged, the size being indicated on the scale T. J is a sliding plate fitted on plate A below the lever M, on the same side with a vertical bracket, $J^1$, projecting upward from the plate opposite the end $x$ of the lever. The edges of this plate are turned on the edges of plate A to confine it thereto, the said edges of the plate A being slightly beveled for the purpose. This slide is for gaging wheels between it and the end $x$ of the lever M, which is so shaped at the end as to present a vertical wall when bearing on the plate. The wheels are placed between the lever and slide J, with the pivots projecting through the slot F. The said slide, having a semicircular notch, $J^2$, in the end moving over the hole B, is employed thereat for gaging wire of any size up to a half inch or therabout.

A scale may also be marked on plate A in connection with the slide, by which to read the measurements.

This slide also serves as a guard for keeping the fingers from contact with the lever when using the tool for glasses; and it also serves to lock the end $x$ of the lever up by shoving bracket $J^1$ under it, if it be desirable to prevent the action of pin L and the lever when gaging the diameters of glasses.

For accuracy it is, of course, necessary that the parts be nicely adjusted and fitted, so that there be no looseness or lost motion in the moving parts.

Having thus described my invention, I claim as new and desire to secure by Letters Patent—

1. An improved watch-maker's gaging-tool, comprising in one complete instrument the following sets of instrumentalities, or either of them, in connection with the plate A, lever M, and finger Q.

2. The adjustable plate C, scale G, finger L, pointer K, and scale I, for simultaneously gaging the diameter and depth of the glasses, substantially as specified.

3. The eccentric pin W, the scale T, and pointer S, for gaging the width of the mainsprings, substantially as specified.

4. The pin V and the scale T, for gaging the thickness of the springs, substantially as specified.

5. The arm Z, adjustable plate $a$, pointer B, and scale T, for gaging pinions and other articles, substantially as specified.

6. The plate J, bracket $J^1$, and slot F, for gaging wheels and other articles, substantially as specified.

7. The hole B and sliding plate J, arranged for gaging wires, substantially as specified.

THEODORE NOEL.

Witnesses:
    ED. C. BROOKSHIRE,
    W. W. RITCHIE.